US007159769B2

(12) United States Patent
Sato

(10) Patent No.: US 7,159,769 B2
(45) Date of Patent: Jan. 9, 2007

(54) STORE COMPLEX CHECKOUT APPARATUS, TRANSACTION PROCESSING METHOD AND PROGRAM

(75) Inventor: Miyuki Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 272 days.

(21) Appl. No.: 10/873,315

(22) Filed: Jun. 23, 2004

(65) Prior Publication Data

US 2005/0194440 A1 Sep. 8, 2005

(30) Foreign Application Priority Data

Mar. 4, 2004 (JP) ............................ 2004-060267

(51) Int. Cl.
*G06K 15/00* (2006.01)

(52) U.S. Cl. ...................................... 235/383; 235/378

(58) Field of Classification Search ................ 235/380, 235/375, 383, 378, 385, 462.01, 379; 705/26, 705/14, 20, 21, 23, 22

See application file for complete search history.

(56) References Cited

U.S. PATENT DOCUMENTS

| | | | | |
|---|---|---|---|---|
| 6,044,358 | A * | 3/2000 | Goodwin, III | 705/20 |
| 6,105,004 | A * | 8/2000 | Halperin et al. | 705/28 |
| 6,510,989 | B1 * | 1/2003 | Ortega | 235/383 |
| 6,886,745 | B1 * | 5/2005 | Berrube et al. | 235/383 |
| 2002/0134834 | A1 * | 9/2002 | Otto | 235/383 |
| 2004/0010452 | A1 * | 1/2004 | LaCour | 705/26 |
| 2005/0040230 | A1 * | 2/2005 | Swartz et al. | 235/383 |
| 2005/0107068 | A1 * | 5/2005 | Smith et al. | 455/409 |

FOREIGN PATENT DOCUMENTS

| | | |
|---|---|---|
| DE | 101 25 239 | 1/2003 |
| EP | 0 973 112 | 1/2000 |
| EP | 973112 A2 * | 1/2000 |
| JP | 10162245 | 6/1998 |
| JP | 2000-155825 | 6/2000 |
| JP | 2002-133518 | 5/2002 |
| WO | WO 95/04491 | 2/1995 |

OTHER PUBLICATIONS

Search Report for corresponding European Appln. No. 04253905.6 dated Jun. 14, 2005.

* cited by examiner

*Primary Examiner*—Michael G. Lee
*Assistant Examiner*—Thien T. Mai
(74) *Attorney, Agent, or Firm*—Staas & Halsey LLP

(57) ABSTRACT

A POS device functioning as a store complex checkout apparatus reads an information storage medium storing at least a product provision store code and a product code attached to products of the and other stores using a medium reading unit, refers to the product master file information and performs checkout when a product checkout processing unit identifies the code as the store code from information read from the information storage medium, and refers to corresponding master file information of other store and performs checkout if the product checkout processing unit identifies the code as the code of other store, causing a transaction management unit to generate and store transaction information including a store code and the product provision store code. Further, a store-to-store information send/receive processing unit performs checkout processing for transaction amount with a store checkout apparatus of other store based on the transaction information.

20 Claims, 24 Drawing Sheets

FIG. 7

22-1

| PRODUCT CODE (86) | PRODUCT NAME (88) | PRICE (90) | COMMENT (92) |
|---|---|---|---|
| 4912345678901 | CHOCOLATE | 150 | THREE FOR ¥400 |
| 4912345666666 | CANDY | 250 | |
| 4912347777777 | BISCUIT | 255 | TRIPLE BONUS POINTS TODAY |

FIG. 8

52-1

| CHECKOUT STORE CODE (96) | PRODUCT PROVISION STORE CODE (98) | TRANSACTION CATEGORY 1: SOLD 2: CANCELED 3: RETURNED (100) | DETAILS OF TRANSACTION DATE/TIME/PRODUCT CODE/PRICE/QUANTITY/OTHERS (102) |
|---|---|---|---|
| 1111 | 1111 | 1 | 031224/4912345678001/10/3000/…… |
| 1111 | 2222 | 2 | 031224/5012345678001/01/12000/…… |
| 1111 | 3333 | 1 | 031224/6012345678001/02/50000/…… |
| 1111 | 1111 | 1 | 031224/4912345678001/10/3000/…… |
| 1111 | 2222 | 1 | 031224/5012345678001/10/3000/…… |
| 1111 | 1111 | 1 | 031224/4912345678001/10/3000/…… |

FIG. 9

26-1

| STORE CODE | STORE NAME | COMMISSION RATE |
|---|---|---|
| 1111 | CONFECTIONARY A | 1.00% |
| 2222 | PHARMACY B | 1.50% |
| 3333 | STORE C | 1.00% |

104 106 108

FIG. 10A

110

| CHECKOUT STORE CODE (112) | PRODUCT PROVISION STORE CODE (114) | TRANSACTION CATEGORY 1:SOLD 2:CANCELED 3:RETURNED (116) | DETAILS OF TRANSACTION DATE/TIME/PRODUCT CODE/PRICE/QUANTITY/OTHERS (118) | COMMISSION (120) |
|---|---|---|---|---|
| 1111 | 2222 | 2 | 031224/5012345678001/01/12000/…… | 180 |
| 1111 | 2222 | 1 | 031224/5012345678001/10/3000/…… | 60 |

FIG. 10B

122

| CHECKOUT STORE CODE (124) | PRODUCT PROVISION STORE CODE (126) | TRANSACTION CATEGORY 1:SOLD 2:CANCELED 3:RETURNED (128) | DETAILS OF TRANSACTION DATE/TIME/PRODUCT CODE/PRICE/QUANTITY/OTHERS (130) | COMMISSION (132) |
|---|---|---|---|---|
| 1111 | 3333 | 1 | 031224/6012345678001/02/50000/…… | 500 |

FIG. 10C

52—2

| 96 CHECKOUT STORE CODE | 98 PRODUCT PROVISION STORE CODE | 100 TRANSACTION CATEGORY 1 : SOLD 2 : CANCELED 3 : RETURNED | 102 DETAILS OF TRANSACTION DATE/TIME/PRODUCT CODE/PRICE/QUANTITY/OTHERS |
|---|---|---|---|
| 1111 | 1111 | 1 | 031224/4912345678001/10/3000/…… |
| 1111 | 1111 | 1 | 031224/4912345678001/10/3000/…… |
| 1111 | 1111 | 1 | 031224/4912345678001/10/3000/…… |

FIG. 11A

134

| CHECKOUT STORE CODE (135) | PRODUCT PROVISION STORE CODE (136) | TRANSACTION CATEGORY 1:SOLD 2:CANCELED 3:RETURNED (138) | DETAILS OF TRANSACTION DATE/TIME/PRODUCT CODE/PRICE /QUANTITY/OTHERS (140) | COMMISSION (142) |
|---|---|---|---|---|
| 2222 | 1111 | 1 | 031224/5012345666666/05/20000/······ | 300 |

FIG. 11B

144

| CHECKOUT STORE CODE (145) | PRODUCT PROVISION STORE CODE (146) | TRANSACTION CATEGORY 1:SOLD 2:CANCELED 3:RETURNED (148) | DETAILS OF TRANSACTION DATE/TIME/PRODUCT CODE/PRICE /QUANTITY/OTHERS (150) | COMMISSION (152) |
|---|---|---|---|---|
| 3333 | 1111 | 1 | 031224/6012345666666/05/20000/······ | 200 |
| 3333 | 1111 | 1 | 031224/6012345666666/05/50000/······ | 500 |

FIG. 12

52-3

| CHECKOUT STORE CODE (96) | PRODUCT PROVISION STORE CODE (98) | TRANSACTION CATEGORY 1: SOLD 2: CANCELED 3: RETURNED (100) | DETAILS OF TRANSACTION DATE/TIME/PRODUCT CODE/PRICE/QUANTITY/OTHERS (102) |
|---|---|---|---|
| 1111 | 1111 | 1 | 031224/4912345678001/10/3000/······ |
| 1111 | 1111 | 1 | 031224/4912345678001/10/3000/······ |
| 1111 | 1111 | 1 | 031224/4912345678001/10/3000/······ |
| 2222 | 1111 | 1 | 031224/5012345666666/05/2000/······ |
| 3333 | 1111 | 1 | 031224/6012345666666/05/2000/······ |
| 3333 | 1111 | 1 | 031224/6012345666666/05/2000/······ |

FIG. 13

154

| DATE (156) | SENDING STORE (158) | RECEIVING STORE (160) | COMMISSION (162) | MONEY TRANSFERRED (164) |
|---|---|---|---|---|
| 2003.12.24 | 1111 | 1111 | 0 | 0 |
| 2003.12.24 | 1111 | 2222 | 180 | −12000 |
| 2003.12.24 | 1111 | 3333 | 60 | −50000 |
| 2003.12.24 | 1111 | 1111 | 0 | 0 |
| 2003.12.24 | 1111 | 2222 | 500 | −3000 |
| 2003.12.24 | 1111 | 1111 | 0 | 0 |
| 2003.12.24 | 2222 | 1111 | −300 | 15000 |
| 2003.12.24 | 3333 | 1111 | −20 | 2000 |
| 2003.12.24 | 3333 | 1111 | −50 | 5000 |

STORE COMPLEX CHECKOUT APPARATUS, TRANSACTION PROCESSING METHOD AND PROGRAM

BACKGROUND OF THE INVENTION

1. Field of the Invention

The present invention relates generally to a store complex checkout apparatus, transaction processing method and program for product checkout at a plurality of stores set up at the same location such as marketplace and shopping mall, and more particularly to a store complex checkout apparatus, transaction processing method and program allowing for product checkout at any stores as long as they are at the same location.

2. Description of the Related Arts

Marketplaces and shopping malls—areas accommodating a number of retail stores in a modern and well-equipped facility—have become pervasive in recent years, allowing enjoyment of shopping and various entertainments at the same time and drawing the spotlight due to its customer gathering power. As a product checkout system in such a store complex, each store has its own POS system installed, handling checkout of product purchases with a POS terminal. While product is labeled in the conventional POS system with bar codes that are read by a barcode reader for checkout processing, recent years have seen a quantum leap in the amount of storable information, putting the use of wireless tag, capable of being made into a microchip, already underway and allowing fast product checkout through information readout from the wireless tag by simply placing product on a counter, etc. near the POS terminal (see Japanese Patent Application Laid-Open Publication Nos. 1998-162245, 2002-133518 and 2000-155825).

In checkout processing for store complex using the conventional wireless tag, however, product of a certain store must always be checked out by the POS terminal of that store, resulting in a situation where, depending on various factors such as period of time of the day, season, and popular products, customers wait in a long line at the register in a certain store while there are no waits in other stores—a problem of insufficient customer service in respect of checkout. In such a case, a possible solution may be to check out product at the register in other stores. However, if the same product is priced differently between stores, it is impossible to determine at which price the item should be checked out, making it necessary to change product codes from one store to another and requiring effort and time to build and run the POS system of each store. Additionally, if product is checked out on behalf of other store, sales amounts cannot be accurately calculated unless the product provision store and the checkout store are clear. This requires the operator to confirm whether the product provider is the store or other store, and, if the product provider is other store, access the POS system of other store and check out product, resulting in heavy workload for the operator. Further, while another solution may be to allow all stores to share a single POS system so that checkout processing with a POS terminal can be carried out independently of stores, those stores participating in store complex vary widely, with some stores having their own POS systems built. This makes it difficult to share a POS system among stores.

SUMMARY OF THE INVENTION

Thus, according to the present invention there are provided a store complex checkout apparatus, a transaction processing method and program that allow product in a plurality of stores to be globally checked out by simply reading medium information attached to product such as wireless tag.

The present invention provides a store complex checkout apparatus. The store complex checkout apparatus of the present invention comprises a medium reading unit for reading information from an information storage medium (wireless tag) attached to a product, the information storage medium storing at least a product provision store code and a product code; a product checkout processing unit that, when the product provision store code in information read from the information storage medium is the store code, refers to a product master of the store to perform checkout processing of the product based on information obtained by the reference, the product checkout processing unit, when the product provision store code is a code of other store, referring to a corresponding product master of an other store to perform checkout processing of the product based on information obtained by the reference; a transaction management unit for generating and storing transaction information including a product provision store code for each of the products; and a store-to-store information send/receive processing unit for exchanging the transaction information with store checkout apparatuses of other stores based on the transaction information. The transaction management unit stores as the transaction information a checkout store code, a product provision store code, a transaction category and transaction detail information, the transaction category being classified into sold, canceled or returned, the transaction detail information including a product code, a price and a quantity. The store-to-store information send/receive processing unit generates store-to-store information send/receive information for transaction information in which the checkout store code and the product provision store code are different from each other, the store-to-store information send/receive processing unit performing money delivery processing accompanying checkout between a checkout store and a product provision store based on the store-to-store information send/receive information. The store-to-store information send/receive information includes a commission paid to the checkout store by the product provision store. The commission is a sum that is determined depending on the degree of contribution of the checkout store.

The information storage medium is a wireless tag or a barcode label. The store complex checkout apparatus further comprises an inquiry processing unit that, based on the product code read from the information storage medium, acquires sales information including prices, store names and bonuses of a same product from product master file information of a plurality of store checkout apparatuses, for display in a comparative manner. The function of the inquiry processing unit may be implemented by a sole apparatus. Thus, the present invention provides a store complex information inquiry apparatus which comprises a medium reading unit for reading an information storage medium attached to a product of the and other stores, the information storage medium storing at least a product provision store code and a product code; and an inquiry processing unit that, based on the product code read from the information storage medium, acquires sales information including prices, store names and bonuses of a same product from product master file information of a plurality of store checkout apparatuses, for display in a comparative manner.

The present invention provides a transaction processing method for a store complex checkout apparatus. The transaction processing method of the present invention comprises:

a medium reading step which includes reading information from an information storage medium attached to a product, the information storage medium storing at least a product provision store code and a product code;

a product checkout processing step which includes, when the product provision store code in information read from the information storage medium is a code of the store, performing checkout processing of the product based on information obtained by referring to a product master file of the store, the product checkout processing step including, when the product provision store code is a code of other store, performing checkout processing of the product based on information obtained by referring to a corresponding product master file of other store;

a transaction managing step which include generating and storing transaction information including a product provision store code for each product; and a store-to-store information send/receive processing step which includes exchanging the transaction information with store checkout apparatuses of other stores based on the transaction information.

The present invention provides a program for transactions executed by a computer making up the store complex checkout apparatus. The program of the present invention causes the computer to execute:

a medium reading step which includes reading information from an information storage medium attached to a product, the information storage medium storing at least a product provision store code and a product code;

a product checkout processing step which includes, when the product provision store code in information read from the information storage medium is a code of the store, performing checkout processing of the product based on information obtained by referring to a product master file of the store, the product checkout processing step including, when the product provision store code is a code of other store, performing checkout processing of the product based on information obtained by referring to a corresponding product master file of other store;

a transaction managing step which include generating and storing transaction information including a product provision store code for each product; and a store-to-store information send/receive processing step which includes exchanging the transaction information with store checkout apparatuses of other stores based on the transaction information.

The present invention provides a POS system in which a server is connected via a network to a plurality of store checkout apparatuses. In this POS system, each of the store checkout apparatuses comprises a medium reading unit for reading information from an information storage medium attached to a product, the information storage medium storing at least a product provision store code and a product code; a product checkout processing unit that, when the product provision store code in information read from the information storage medium is the store code, refers to a product master file of the store to perform checkout processing of the product based on information obtained by the reference, the product checkout processing unit, when the product provision store code is a code of other store, referring to a corresponding product master file of the other store to perform checkout processing of the product based on information obtained by the reference; a transaction management unit for generating and storing transaction information including a product provision store code for each product; and a store-to-store information send/receive processing unit for exchanging the transaction information with store checkout apparatuses of other stores based on the transaction information, wherein the server stores the product master files and all transaction information used in the store checkout apparatuses of the stores, the server exchanging the transaction information with each of the store checkout apparatuses. It is to be noted that the details of the transaction processing method, program and POS system of the present invention are basically identical to those of the store complex checkout apparatus.

It is therefore possible according to the present invention to check out product in any stores at the price of the product provider by storing a store code, a code representing the product provision store, in the information storage medium such as wireless tag. As a result, customers may make purchases at a plurality of stores and check out product at any stores in a store complex. This relieves them from checkouts at individual stores, ensuring reduced number of checkouts, spreading checkout registers, shortening wait lines and improving customer service. The product provision store and checkout store can be obtained as transaction information during checkout through reading of wireless tag, etc., making it possible to accurately transfer the sales amount from the checkout store to the product provision store thereafter. By paying a commission from the product provision store to the checkout store, checkout on behalf of other store is conducted as a charged service for other store. Since checkout on behalf of other store produces income, it is possible to provide customer service without sparing effort even for checking out product of other store, thus enhancing customer service of the store complex as a whole. Further, the product provision store and product itself can be read from the medium such as wireless tag, making it possible to obtain and display in a comparative manner the prices of identical products among a plurality of stores and product information including bonus and providing product selection opportunities tailored to customer needs.

The above and other objects, features, and advantages of the present invention will become more apparent from the following detailed description with reference to the drawings.

BRIEF DESCRIPTION OF THE DRAWINGS

FIG. 7 is an explanatory view of a product master file of FIGS. 2A and 2B;

FIG. 8 is an explanatory view of the transaction file in use in the POS device of FIGS. 2A and 2B;

FIG. 9 is an explanatory view of a commission rate file of FIGS. 2A and 2B;

FIGS. 10A to 10C are explanatory views of store-to-store information send/receive information transmitted to other stores and a transaction file with the store-to-store information send/receive information deleted;

FIGS. 11A and 11B are explanatory views of store-to-store information send/receive information received from other store servers;

FIG. 12 is an explanatory view of a transaction file for which store-to-store checkout is complete;

FIG. 13 is an explanatory view of a store-to-store money delivery file created in store-to-store information send/receive processing;

DETAILED DESCRIPTION OF THE PREFERRED EMBODIMENTS

Figure 1A:
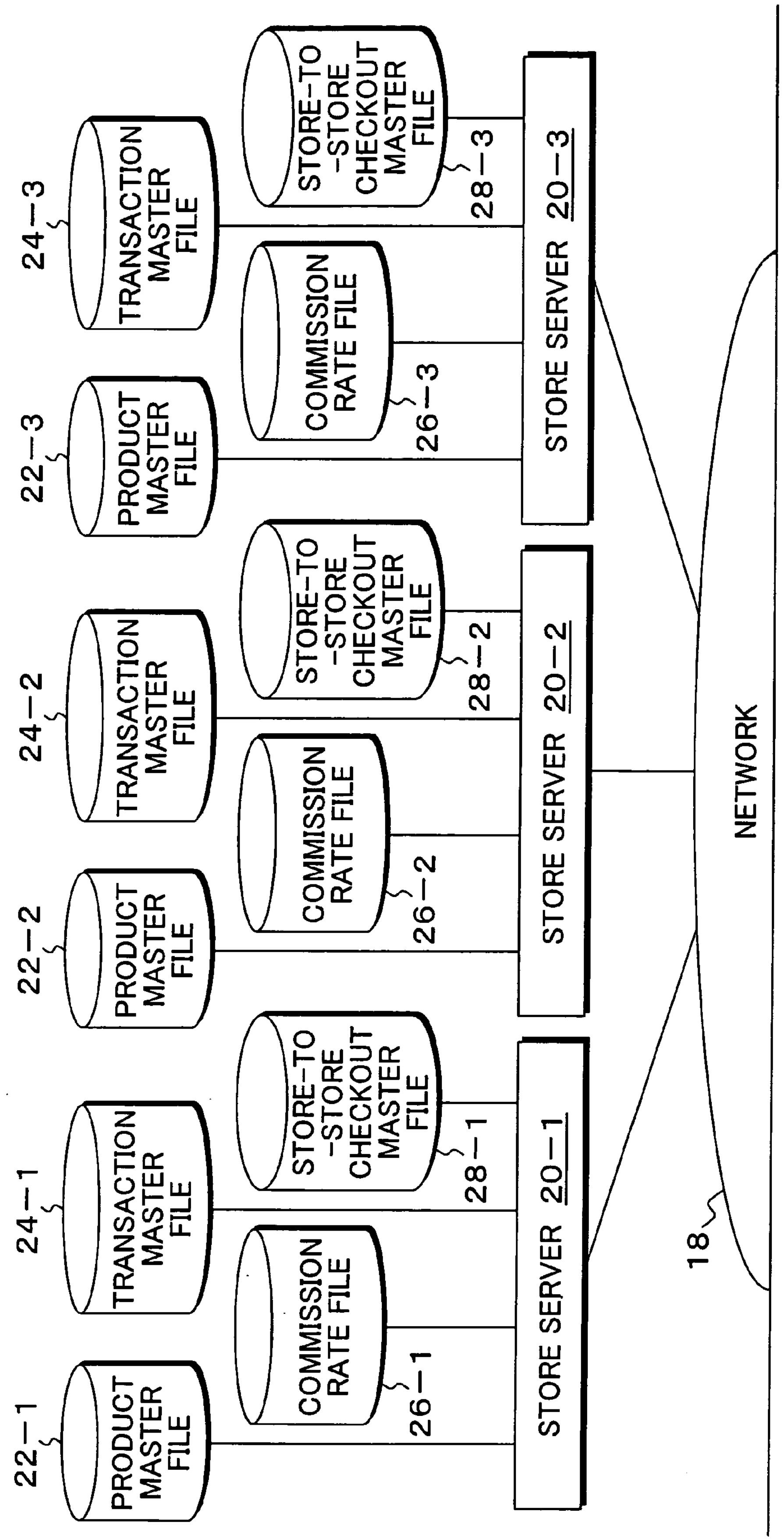
FIGS. 1A and 1B are explanatory views of a store complex checkout system to which the present invention is applied.
Figure 1B:
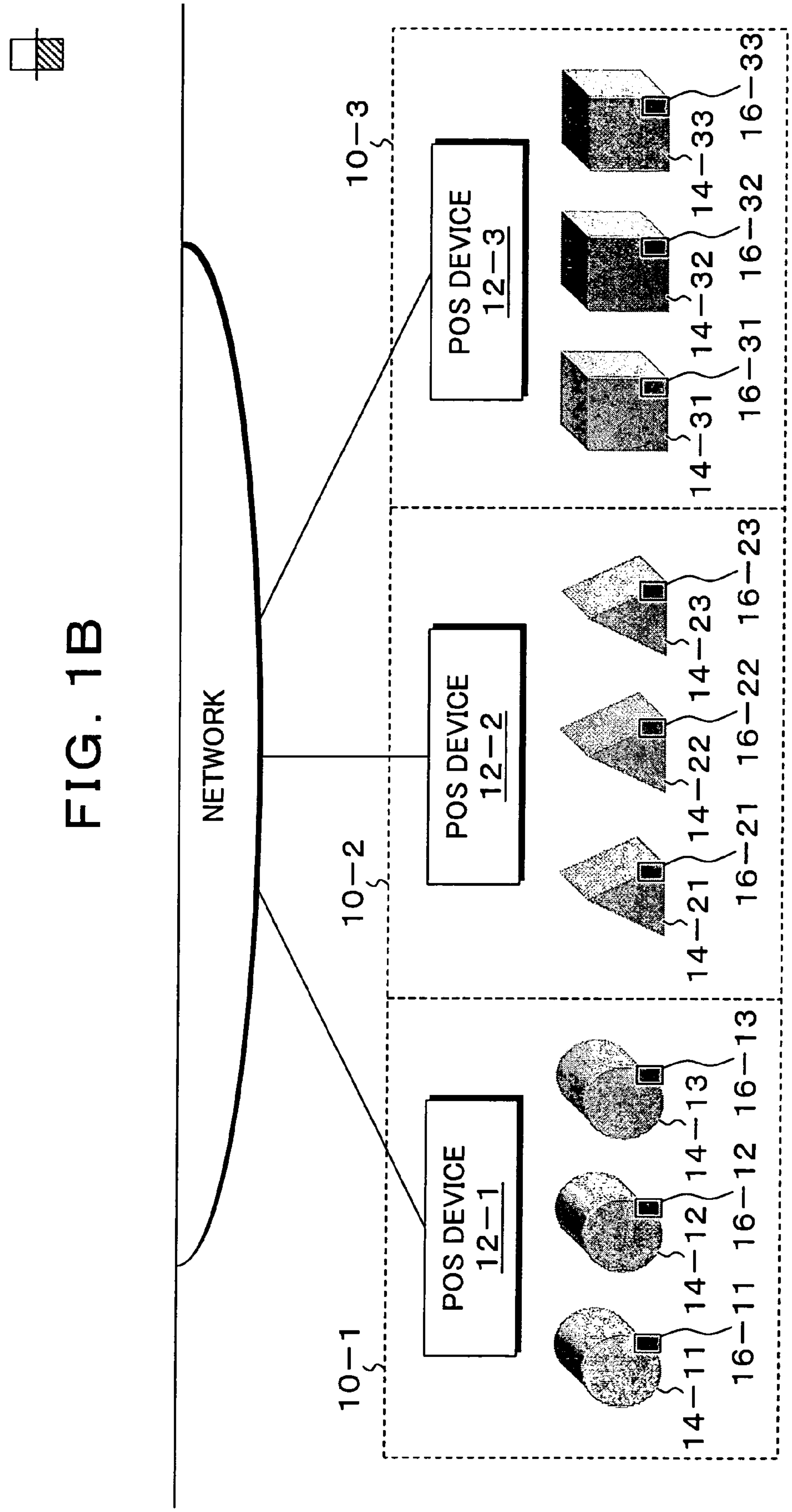

FIGS. 1A and 1B are explanatory views of a store complex checkout system to which the present invention is applied. In FIGS. 1A and 1B, the present invention is targeted for facilities where a plurality of stores such as stores 10-1, 10-2 and 10-3 are set up at the same location as in a marketplace or shopping mall. The stores 10-1, 10-2 and 10-3 have POS devices 12-1, 12-2 and 12-3, devices functioning as store complex checkout devices, installed independently and respectively. In the stores 10-1, 10-2 and 10-3, products 14-11 to 14-13, 14-21 to 14-23 and 14-31-to 14-33 are showcased respectively, with wireless tags 16-11 to 16-13, 16-21 to 16-23 and 16-31-to 16-33 attached respectively to the products and at least the product provision store code and product code stored in the tags. To write wireless tag information including the product provision store code and product code to the wireless tags 16-11 to 16-33, it suffices to do so using a publicly known wireless tag writing device in each of the stores 10-1 to 10-3 with the wireless tags attached to the products. Users using the stores 10-1 to 10-3 can have product of any of the stores checked out with the POS device of other store. For example, a user attempting to purchase the product 14-11 of the store 10-1 can have the item checked out not only with the POS device 12-1 of the store 10-1 but also with the POS devices 12-2 and 12-3 of the other stores 10-2 and 10-3. There are provided store servers 20-1, 20-2 and 20-3 via a network 18 correspondingly with the POS devices 12-1 to 12-3 of the stores 10-1 to 10-3. The store servers 20-1, 20-2 and 20-3 are provided respectively and independently with product master files 22-1, 22-2 and 22-3, transaction master files 24-1, 24-2 and 24-3, commission rate files 26-1, 26-2 and 26-3 and store-to-store information send/receive master files 28-1, 28-2 and 28-3.

Figure 2A:
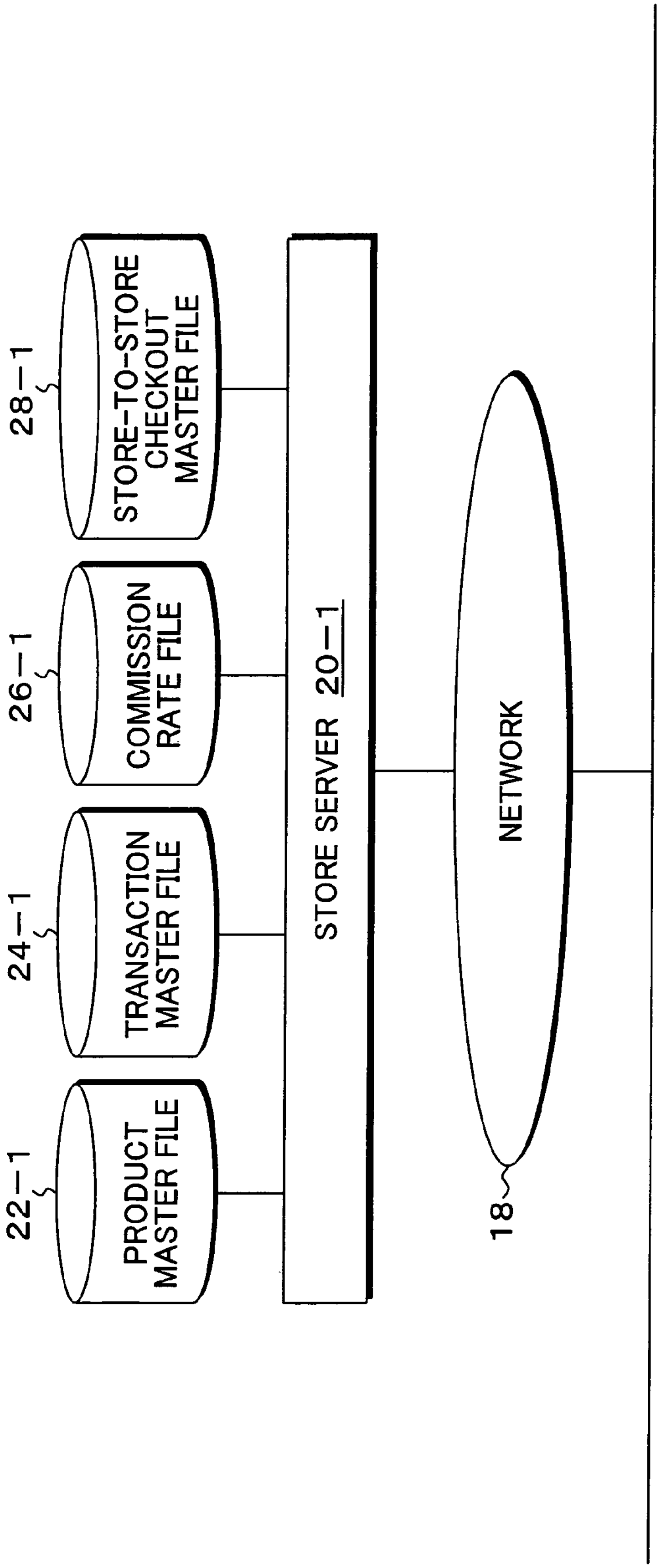
FIGS. 2A and 2B are explanatory views of the functional configuration of a POS device performing checkout processing of the present invention.
Figure 2B:
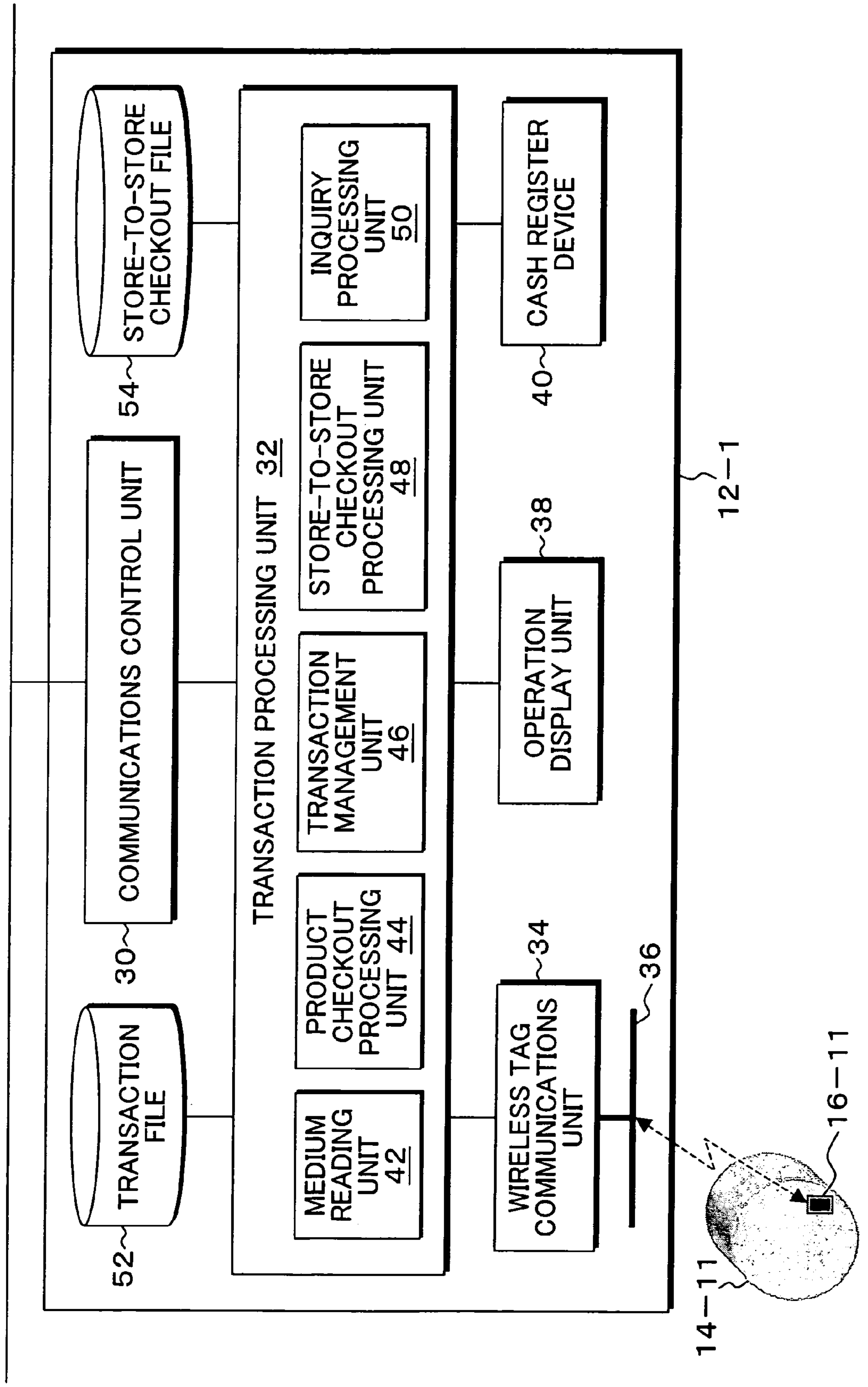

FIGS. 2A and 2B are explanatory views of the functional configuration of a POS device performing checkout processing of the present invention and shows the device together with the store server 20-1 to which the POS device 12-1, provided in the store 10-1 of FIGS. 1A and 1B, is connected via the network 18. In FIGS. 2A and 2B, the POS device 12-1 is provided with a communications control unit 30 and a transaction processing unit 32. The communications control unit 30 exchanges information with the store server 20-1 via the network 18. For the transaction processing unit 32, there are provided a wireless tag communications unit 34 equipped with an antenna 36, an operation display unit 38 for product checkout processings and a cash register device 40 for cash processing during checkout. For the transaction processing unit 32, there are also provided a transaction file 52 required for store-to-store information send/receive processing and a store-to-store information send/receive file 54. While, in the present embodiment, an example is taken in which there is provided the single POS device 12-1 for the store server 20-1 via the network 18, a plurality of POS devices may be provided for the store server 20-1. Therefore, there are provided the transaction master file 24-1 and the store-to-store information send/receive master file 28-1 on the side of the store server 20-1 as opposed to the transaction file 52 and the store-to-store information send/receive file 54 provided on the side of the POS device 12-1. In the transaction processing unit 32 of the POS device 12-1, there are provided a medium reading unit 42, a product checkout processing unit 44, a transaction management unit 46 and a store-to-store information send/receive processing unit 48, and further an inquiry processing unit 50. Among these, processings required for checkout processing of the present invention for a plurality of stores are the medium reading unit 42, the product checkout processing unit 44, the transaction management unit 46 and the store-to-store information send/receive processing unit 48, whereas the inquiry processing unit 50 is provided additionally for product inquiries different from the checkout processing. The medium reading unit 42 reads wireless tag information including product provision store code and product code from the wireless tag 16-11 attached, for example, to the product 14-11 via the wireless tag communications unit 34 and the antenna 36. The product checkout processing unit 44 refers to the product master file 22-1 of the store server 20-1 when it identifies the code as the store code from the information read by the medium reading unit 42, performing checkout processing based on the price obtained from the product master file 22-1. On the other hand, the product checkout processing unit 44 accesses the corresponding store server 20-2 or 20-3 of other store of FIGS. 1A and 1B via the network 18 if it identifies the code as that of other store, referring to the master file 22-2 or 22-3, recognizing the price of the product and performing checkout processing. The transaction management unit 46 generates transaction information including checkout store code and product provision store code and stores the information in the transaction file 52 each time checkout processing by the product checkout processing unit 44 ends. The store-to-store information send/receive processing unit 48 executes transaction amount checkout processing with the POS device 12-2 or 12-3 of other store based on the transaction information in the transaction file 52. That is, the store-to-store information send/receive processing unit 48 creates store-to-store information send/receive information for transaction information in which the checkout store code and the product provision store code are different, i.e., transaction information for checkout performed on behalf of other store, and stores the information in the store-to-store information send/receive file 54, and executes, based on this store-to-store information send/receive information, money transfer processing accompanying checkout between the checkout store and the product provision store. Money transfer processing is carried out by creating a store-to-store money delivery file. Further, in the present invention, store-to-store information send/receive information includes a commission paid by a product provision store to a checkout store for checkout performed on behalf of the product provision store. This commission is calculated based on the contents of the commission rate file 26-1. The commission for checkout performed on behalf of the product provision store is the sum determined according to the degree of contribution of checkout stores, and a fixed commission rate for each checkout store is, for example, stored in the commission rate file 26-1 and used. Further, the inquiry processing unit 50 obtains sales information such as price of the same product determined by the product code, store name and bonus from the product master files 22-1 to 22-3 corresponding with the plurality of POS devices 12-1 to 12-3 based on the product code read from the wireless tag 16-11, allowing the sales information to be displayed in a comparative manner to users, for example, using the operation display unit 38 of the POS device 12-1.

Figure 3:
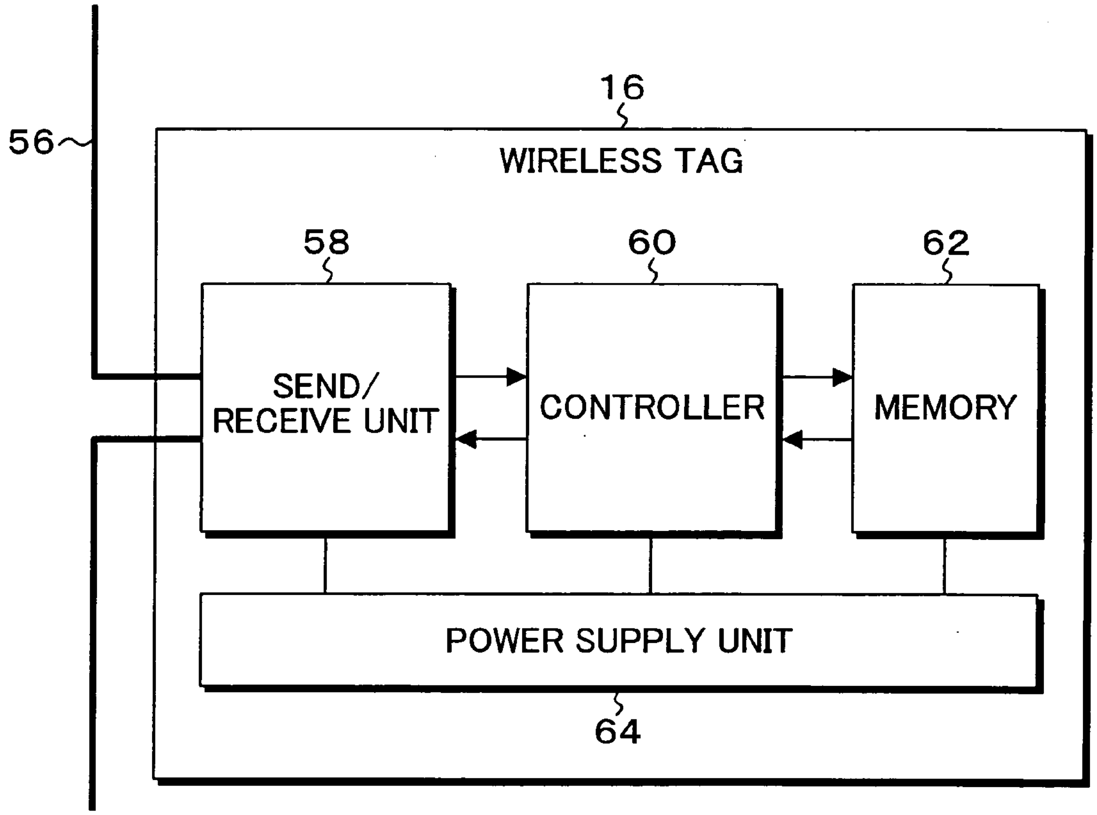
FIG. 3 is a block diagram of a wireless tag of FIGS. 2A and 2B.
Figure 4:
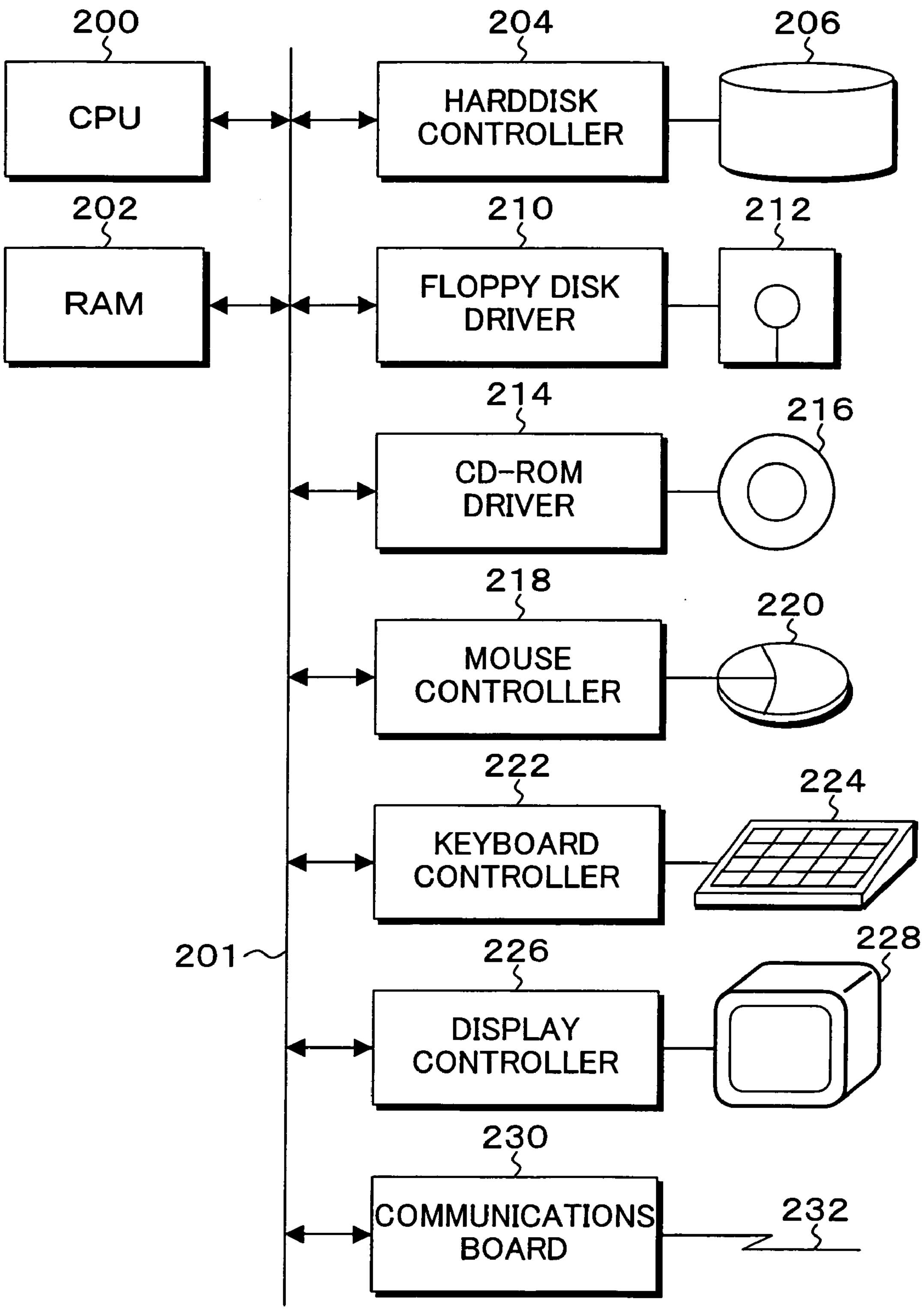
FIG. 4 is an explanatory view of a computer hardware environment to which the POS device of FIGS. 2A and 2B is applied.

FIG. 3 is a block diagram of the wireless tag 16-11 attached to the product 14-11 of FIGS. 2A and 2B. In FIG. 3, the wireless tag 16 is configured with an antenna 56, a send/receive unit 58, a controller 60, a memory 62 and a power supply unit 64. When the wireless tag 16 enters the receive range of the antenna 36 of the wireless tag communications unit 34 provided in the POS device 12-1 of FIGS. 2A and 2B, the power supply unit 64 supplies power to the individual units as a result of electromagnetic induction in the antenna 56, putting the wireless tag 16 in operation. A tag read request is constantly transmitted from the wireless tag communications unit 34 of the POS device 12-1, and upon receipt of the request by the send/receive unit 58, the controller 60 reads wireless tag information stored in the memory 62 and transmits the information as a response. Such a wireless tag is, for example, a small semiconductor chip of 0.5 mm or less in size. The POS device of FIGS. 2A and 2B is implemented, for example, by computer hardware resources as shown in FIG. 4. In the computer of FIG. 4, a RAM 202, a hard disk controller (software) 204, a floppy disk driver (software) 210, a CD-ROM driver (software) 214, a mouse controller 218, a keyboard controller 222, a display controller 226 and a communications board 230 are connected to a bus 201 of a CPU 200. The hard disk controller 204 has a hard disk drive 206 connected to it with programs for executing store-to-store information send/receive processing loaded into the drive, calling, during bootup, necessary programs from the hard disk drive 206 into the RAM 202 for execution by the CPU 200. A floppy disk drive (hardware) 212 is connected to the floppy disk driver 210, enabling read from and write to floppy disks (R). A CD driver (hardware) 216 is connected to the CD-ROM driver 214, allowing data and programs to be read from CDs. The mouse controller 218 informs the CPU 200 of input operations of a mouse 220. The keyboard controller 222 informs the CPU 200 of input operations of a keyboard 224. The display controller 226 provides display on a display unit 228. The communications board 230 communicates with devices within the network and external devices on the Internet using a communications circuit 232 including wireless.

Figure 5:
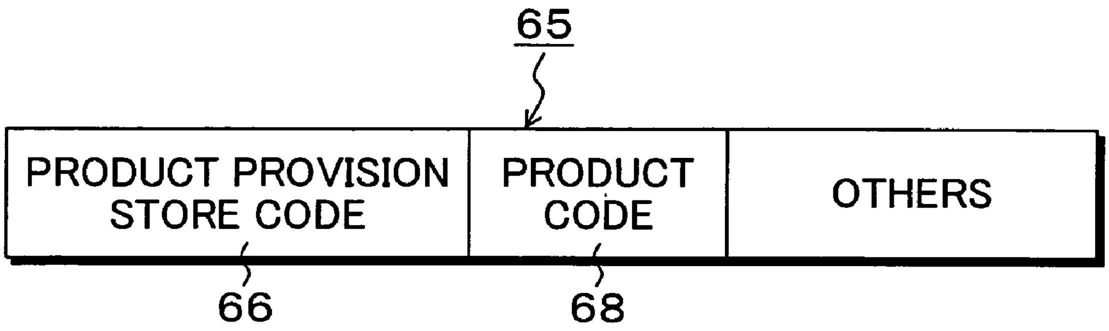
FIG. 5 is an explanatory view of wireless tag information stored in the wireless tag of FIGS. 2A and 2B.

FIG. 5 is an explanatory view of wireless tag information stored in the wireless tag of FIGS. 2A and 2B. Wireless tag information 65 consists of a product provision store code 66, a product code 68 and other information. It is possible, by reading a wireless tag storing the wireless tag information 65 with any of the POS devices 12-1 to 12-3 provided in the stores 10-1 to 10-3 of FIGS. 1A and 1B, to recognize whether a product is from the store or from other store through the product provision store code 66 obtained from the read information. For instance, when the code is identified as the store code with the POS device 12-1 of the store 10-1, the store server 20-1 of the store is accessed via the network 18, acquiring product information from the product code by referencing the product master file 22-1. On the other hand, if the code is identified as the code of other store with the POS device 12-1, the store server 20-2 or 20-3 corresponding with the other store 10-2 or 10-3 is accessed via the network 18, acquiring transaction information corresponding with the product code from the product master file 22-2 or 22-3.

Figure 6:
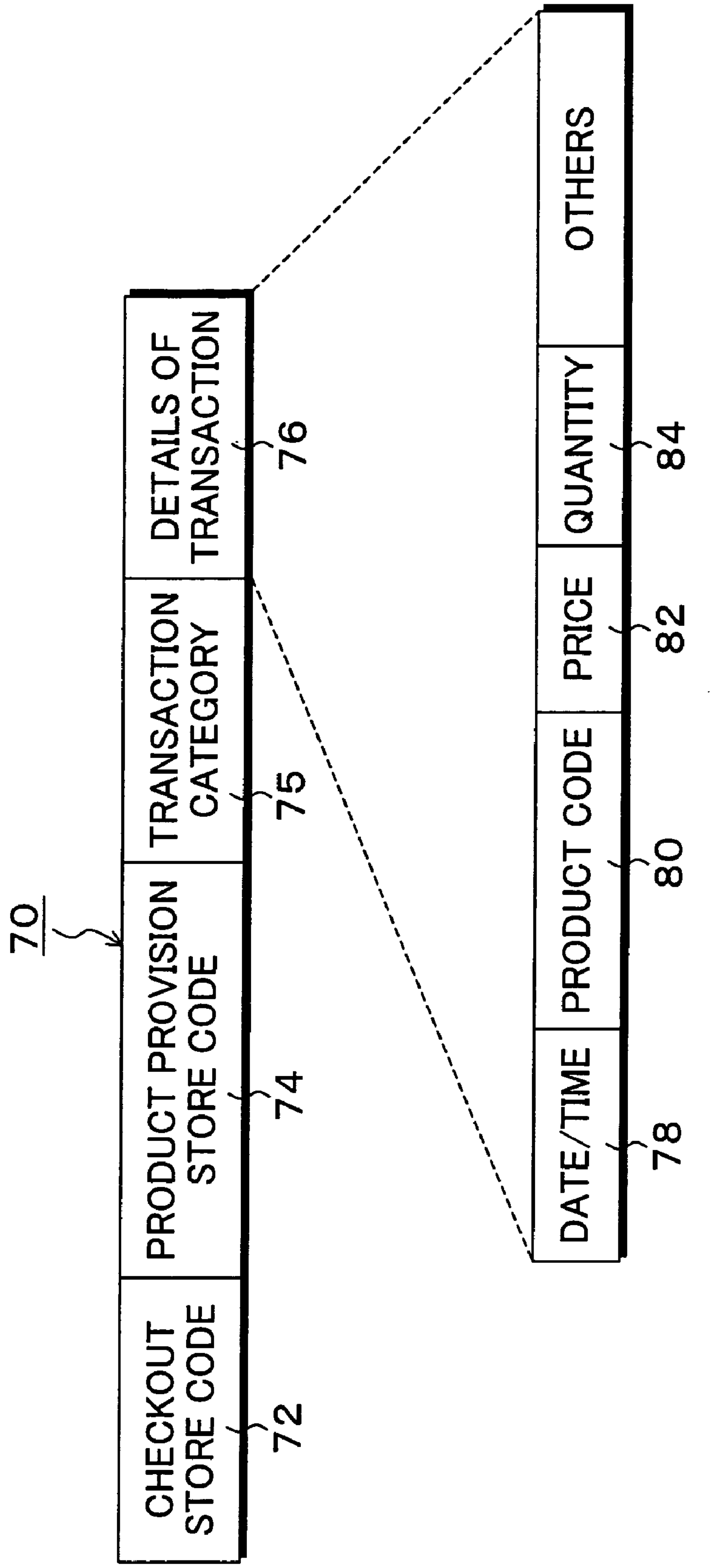
FIG. 6 is an explanatory view of transaction information stored in a transaction file of FIGS. 2A and 2B.

FIG. 6 is an explanatory view of transaction information 70 stored in the transaction file 52 of FIGS. 2A and 2B. The transaction Information 70 consists of a checkout store code 72, a product provision store code 74, a transaction category 75 and details of transaction 75. There are three types of the transaction category 75, namely, "sold". "canceled" and "returned." As shown enlarged by dashed lines, the details of transaction 75 consist of a date/time 78, a product code 80, a price 82, a quantity 84 and other information. Here, the checkout store code 72 and the product provision store code 74 are the same code in the transaction information 70 when a product of the store is checked out with the POS device 12-1 of the store. In contrast, if a product is checked out at other store, the checkout store code 72 and the product provision store code 74 are different codes.

FIG. 7 is an explanatory view of the product master file 22-1 provided on the side of the store server 20-1. The product master file 22-1 consists of a product code 86, a product name 88, a price 90 and a comment 92. The product code 86 is a standardized common code for the product master files 22-1, 22-2 and 22-3 of the store servers 20-1 to 20-3 shown in FIGS. 1A and 1B, whereas the comment 92 indicates the bonus at each store.

FIG. 8 is an explanatory view of a transaction file 52-1 in use in the POS device 12-1 of FIGS. 2A and 2B. The transaction file 52-1 consists of a checkout store code 96, a product provision store code 98, a transaction category 100 and details of transaction 102, having a file structure in which the transaction information 70 shown in FIG. 6 is stored for each transaction as one record. The transaction file 52-1 in use shows that a transaction in which the checkout store code 96 and the product provision store code 98 are both "1111" means that product of the store was checked out at the store 10-1 of the POS device 12-1 in the transaction. In contrast, a transaction in which the checkout store code 96 is "1111" and the product provision store code 98 is "2222" or "3333" means that product of the other store 10-2 or 10-3 was checked out at the store 10-1 on behalf thereof. As for the transaction category 100, code numbers "1", "2" and "3" represent sold, canceled and returned, respectively.

FIG. 9 is an explanatory of the commission rate file 26-1 provided on the side of the store server 20-1 of FIGS. 2A and 2B. The commission rate file 26-1 consists of a store code 100, a store name 106 and a commission rate 108. Here, the store codes "1111", "2222" and "3333" represent the stores 10-1, 10-2 and 10-3 of FIGS. 1A and 1B, respectively. On the other hand, the commission rate 108 is a percentage of commission in the sales price, with the commission rate varying between 1% and 2%. This percentage is determined according to the degree of contribution of operations in checkout on behalf of other store.

FIG. 10A to 10C are explanatory views of store-to-store information send/receive information and a transaction file in store-to-store information send/receive processing when the store closes and the checkout processing time arrives with the transaction file 52-1 in the status as shown in FIG. 8 while in service. From the transaction file 52-1 in use in FIG. 8, store-to-store information send/receive information 110 for the store 10-2 of FIG. 10A and store-to-store information send/receive information 122 for the store 10-3 of FIG. 10B are created. The store-to-store information send/receive information 110 in FIG. 10A contains a checkout store code 112, a product provision store code 114, a transaction category 116 and details of transaction 118. While these are the same contents as those of the transaction file 52-1, a commission 120 is further added. The commission 120 is calculated by referencing the commission rate file 26-1 shown in FIG. 9 using the product provision store code 114, finding the corresponding commission rate and then multiplying the price in the details of transaction 118 by the rate. As for the store-to-store information send/receive information 110 for the store 10-2 in FIG. 10A, the commission rate 108 obtained by referencing the commission rate file 26-1 shown in FIG. 8 using the product provision store code "2222" is "1.50%." Therefore, the prices are multiplied by the commission rate for the two transactions, thus calculating the commissions to be "¥180" and "¥60." The store-to-store information send/receive information 122 in FIG. 10B is store-to-store information send/receive information from the store 10-1 to the store 10-3 having the store code "3333." Since the commission rate 108 is found to be "1.00%" by referencing the commission rate file 26-1 in FIG. 9 using the product provision store code "3333", a commission 132 is calculated to be "¥500" as a result of multiplication of the price in the details of transaction by the commission rate. Once the store-to-store information send/receive information 110 and 122 is created and transmitted for the other stores 10-2 and 10-3 as in FIGS. 10A and 10B, the transaction file 52-1 in FIG. 8 turns into a checked-out and transmitted transaction file 52-2 as shown in FIG. 10C as a result of deletion of information whose checkout is complete. The checked-out and transmitted transaction file 52-2 contains only transactions of the store.

FIGS. 11A and 11B are explanatory views of checkout transaction information received by the store 10-1 as a result of closing processing at the other stores 10-2 and 10-3. FIG. 11A shows checkout transaction information 134 received from the store 10-2, whereas FIG. 11B is checkout transaction information 136 received from the store 10-3.

The checkout transaction information 134 and 136 from the stores 10-2 and 10-3 consists respectively of checkout store codes 134 and 144, product provision store codes 136 and 146, transaction categories 138 and 148, details of transaction 140 and 150, and further commissions 142 and 152 as with the store-to-store information send/receive information 110 and 122 for the other stores shown in FIGS. 10A and 10B.

FIG. 12 is an explanatory view of a transaction file 52-3 when store-to-store checkout shown in FIGS. 10A to 10C and FIGS. 11A and 11B is complete. The checked-out transaction file 52-3 contains, in addition to the contents of the checked-out and transmitted transaction file 54-2 shown in FIG. 10C, checkout transaction information received from the other stores 10-2 and 10-3 in FIGS. 11A and 11B.

FIG. 13 is an explanatory view of a store-to-store money delivery file 154 created in the store-to-store checkout processing. The store-to-store money delivery file 154 consists of a date 156, a sending store 158, a receiving store 160, a commission 162 and money transferred 164. The store-to-store money delivery file 154 takes the store 10-1 having the store code "1111" as an example, with the commission 162 and the money transferred 164 exchanged for transactions in which the sending store 158 and the receiving store 160 are different in store code. The commission 162 and the money transferred 164 with minus sign are sums paid to the receiving store, whereas the positive commission 162 and the positive money transferred 164 without minus sign are sums received from the sending store. Based on the store-to-store money delivery file 154 or other file, the total sum of the commission 162 and the money transferred 164 is compiled for each receiving store, thus transferring money to the other stores when the sum of money is negative and receiving money from the other stores through charging if the sum of money is positive. Actual money transfer is naturally conducted as a bank-to-bank transaction based on the store-to-store money delivery file 154.

Figure 14A:
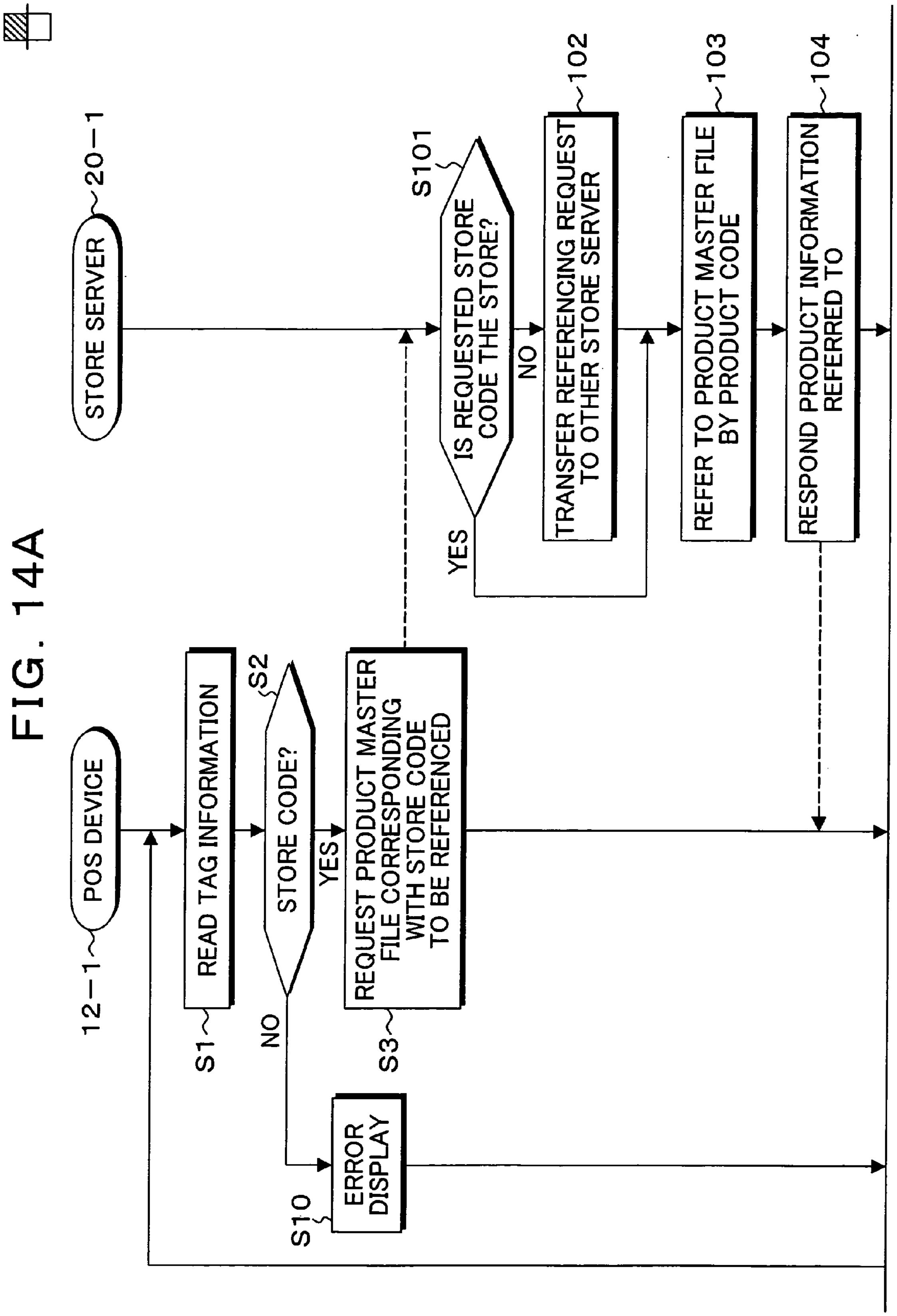
FIGS. 14A and 14B are flowcharts showing processing operations of the POS device of FIGS. 2A and 2B together with store server processings.
Figure 14B:
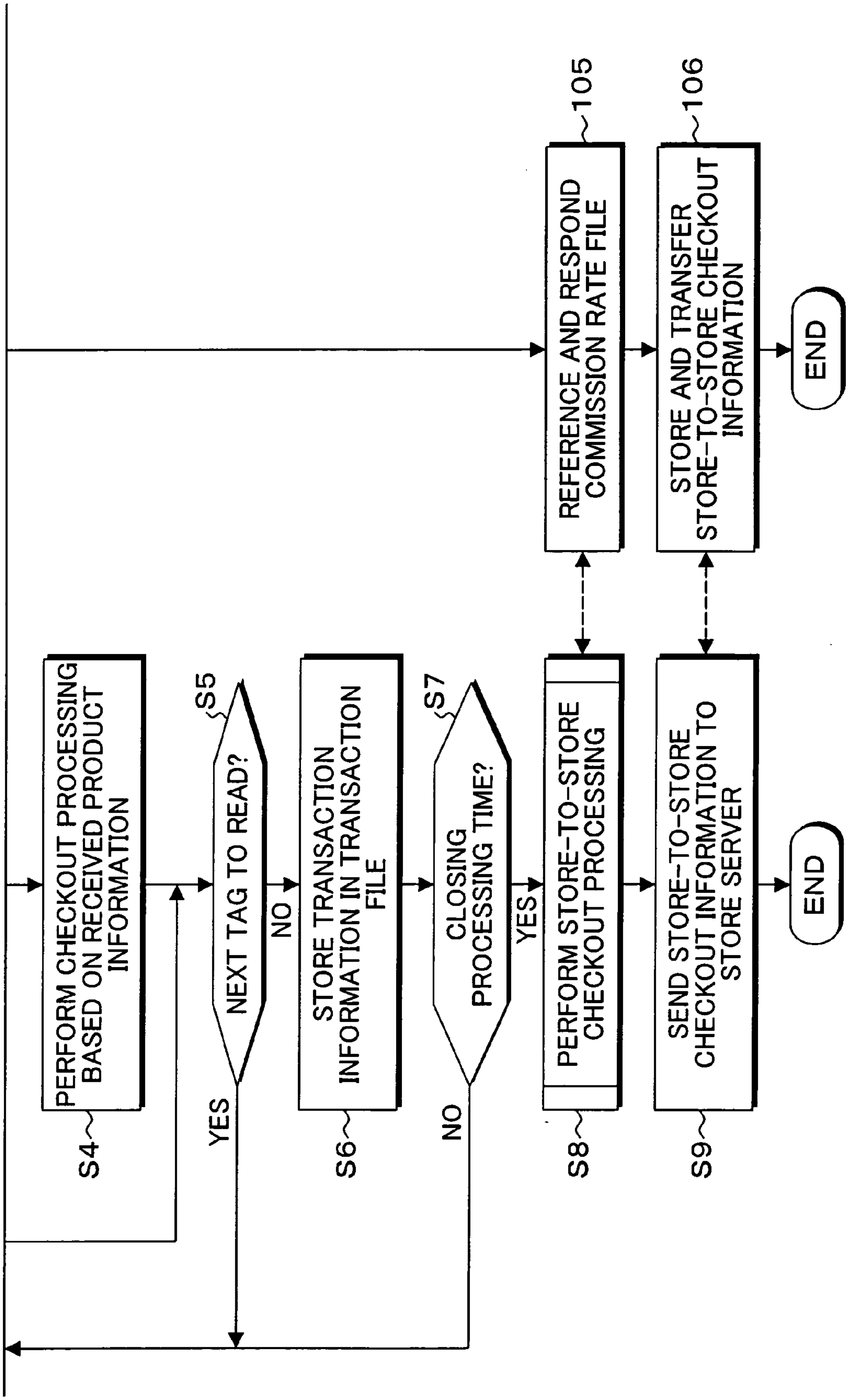

FIGS. 14A and 14B are flowcharts showing processing operations of the POS device of FIGS. 2A and 2B together with store server processings. In FIG. 14A, the POS device 12-1 reads tag information by accessing the wireless tag at Step S1 and checks for a store code at Step S2. In the absence of a store code, the POS device 12-1 displays an error at Step S10. In the presence of a store code, the POS device 12-1 requests the store server 20-1 to reference the product master file 22-1 corresponding with the store code at Step S3. The store server 20-1 checks at Step S101, in response to the request to reference the product master file 22-1 received from the POS device 12-1, whether or not the requested store code is the store code. If the store code is not the store code, the store server 20-1 transfers a referencing request to the other store servers at Step S102. Then, the store server 20-1 refers to the product master file of the or other store server by the product code at Step S103 and returns the referred-to product information to the POS device 12-1 at Step S104. The POS device 12-1 performs checkout processing by obtaining the price from the product information received from the store server 20-1 at Step S4. Next at Step S5, the POS device 12-1 checks for a next tag to read at Step S5 and returns to Step S1 when there is a tag response. If there is no next tag to read, the POS device 12-1 stores transaction information in the transaction file 52 at Step S6. Next at Step S7, the POS device 12-1 checks whether it is the closing time such as store closing time and repeats the processings from Step S1 until the closing time is reached. If the POS device 12-1 determines at Step S7 that the closing time such as store closing time has arrived, the POS device 12-1 executes store-to-store information send/receive processing at Step S8. The store-to-store information send/receive processing is performed through referencing and returning of the commission rate file 26-1 shown at Step S105 of the store server 20-1. When the store-to-store information send/receive processing is complete at Step S8, the POS device 12-1 transmits store-to-store information send/receive information to the store server 20-1 at Step S9, and then stores store-to-store information send/receive information and transfers the information to other store servers, thus ending a series of processings.

Figure 15:
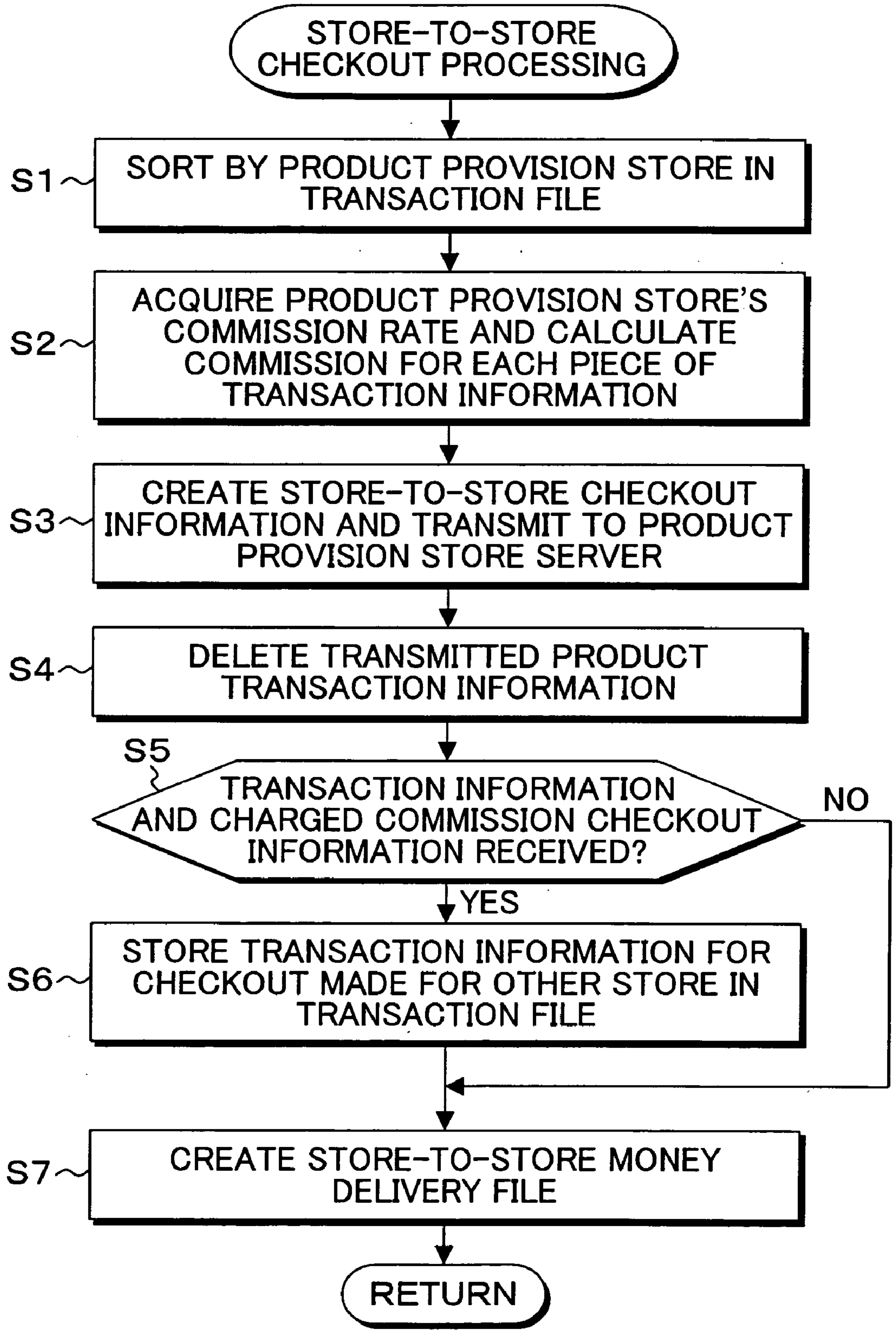
FIG. 15 is a flowchart showing the store-to-store information send/receive processing in the POS device of FIGS. 14A and 14B.

FIG. 15 is a flowchart showing the details of the store-to-store information send/receive processing in the POS device 12-1 of FIGS. 14A and 14B. In the store-to-store information send/receive processing, the POS device 12-1 sorts information in the transaction file 52-1 as shown in FIG. 8 by product provision store code at Step S1, and then obtains the commission rate of the product provision store by referencing the commission rate file 26 and calculates the commission for each piece of transaction information at Step S2. Next, the POS device 12-1 creates, at Step S3, the store-to-store information send/receive information 110 or 122 as shown in FIGS. 10A and 10B and transmits it to the store server of the product provision store. At Step S4, the POS device 12-1 creates the transaction file 52-2 with transaction information deleted such as that transmitted at Step S4 shown in FIG. 10C. Next, the POS device 12-1 checks at Step 5 whether transaction information and charged commission checkout information has been received from the other store servers. When the checkout transaction information 134 or 136 as shown in FIGS. 10A and 10B has been received from the other store, for example, the POS device 12-1 creates a transaction file storing transaction information received from the other store such as the transaction file 52-3 of FIG. 12. At Step S7, the POS device 12-1 creates the store-to-store money delivery file 154 as that shown in FIG. 13, thus ensuring money exchange between the store servers. While, in the aforementioned embodiment, a description was given of the case in which transaction information is accumulated at each store until the store closing time and transaction information is exchanged when the closing time arrives, exchange of transaction information at each store may be performed each time one transaction is complete.

Figure 16:
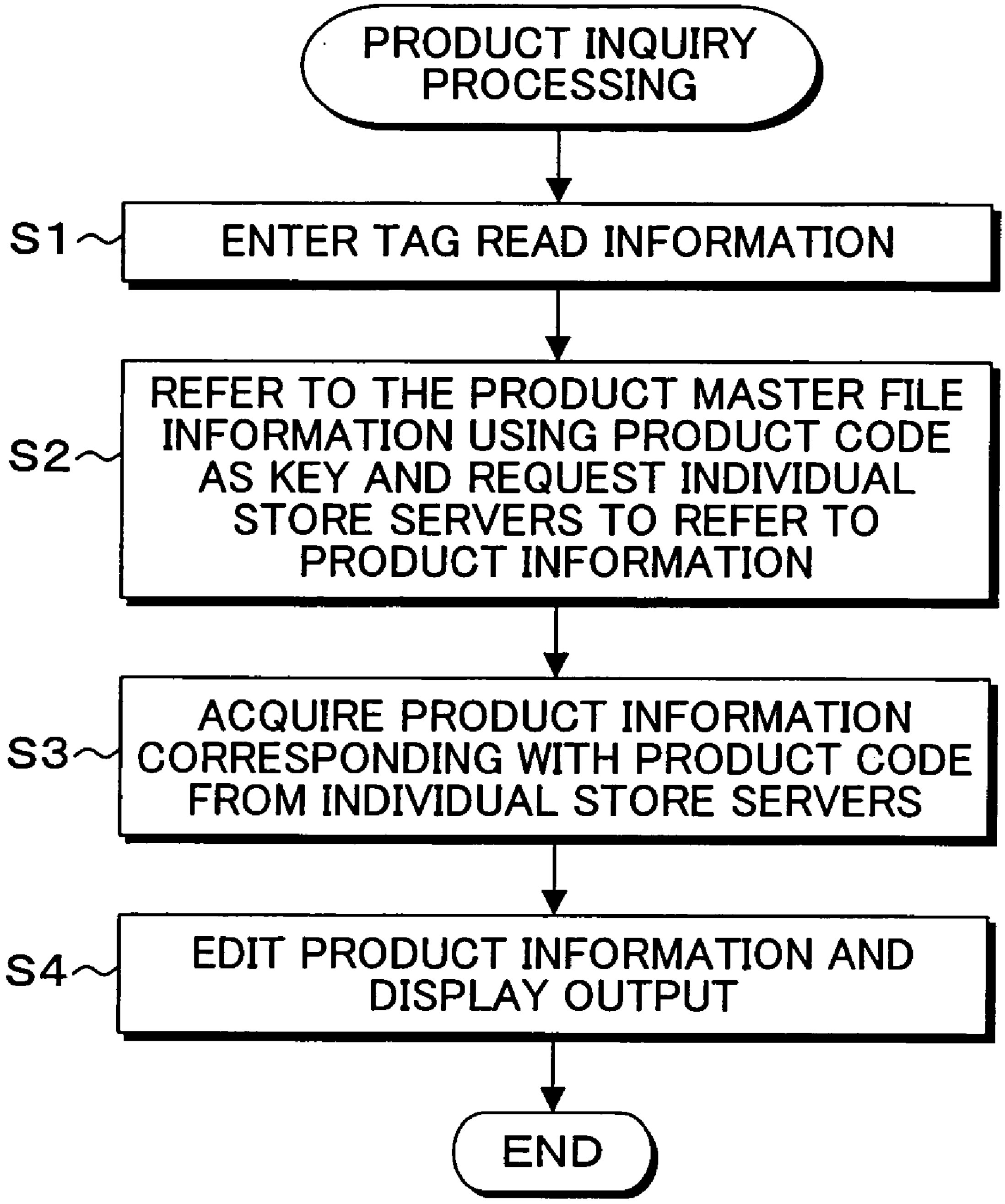
FIG. 16 is a flowchart of a product inquiry processing in the POS device of FIGS. 2A and 2B.

FIG. 16 is a flowchart of a product inquiry processing performed by the inquiry processing unit 50 of the POS device 12-1. In the product inquiry processing, the inquiry processing unit 50 enters tag read information read from the wireless tag at Step S1. At Step S2, the inquiry processing unit 50 refers to the product master file 22-1 of the store server 20-1 using the product code in the read information as key, and requests the other store servers 20-2 and 20-3 shown in FIGS. 1A and 1B to refer to product information. At Step S3, the inquiry processing unit 50 acquires product information corresponding with the product code from the store servers 20-1 to 20-3, and then edits product information and displays the output at Step S4.

Figure 17:
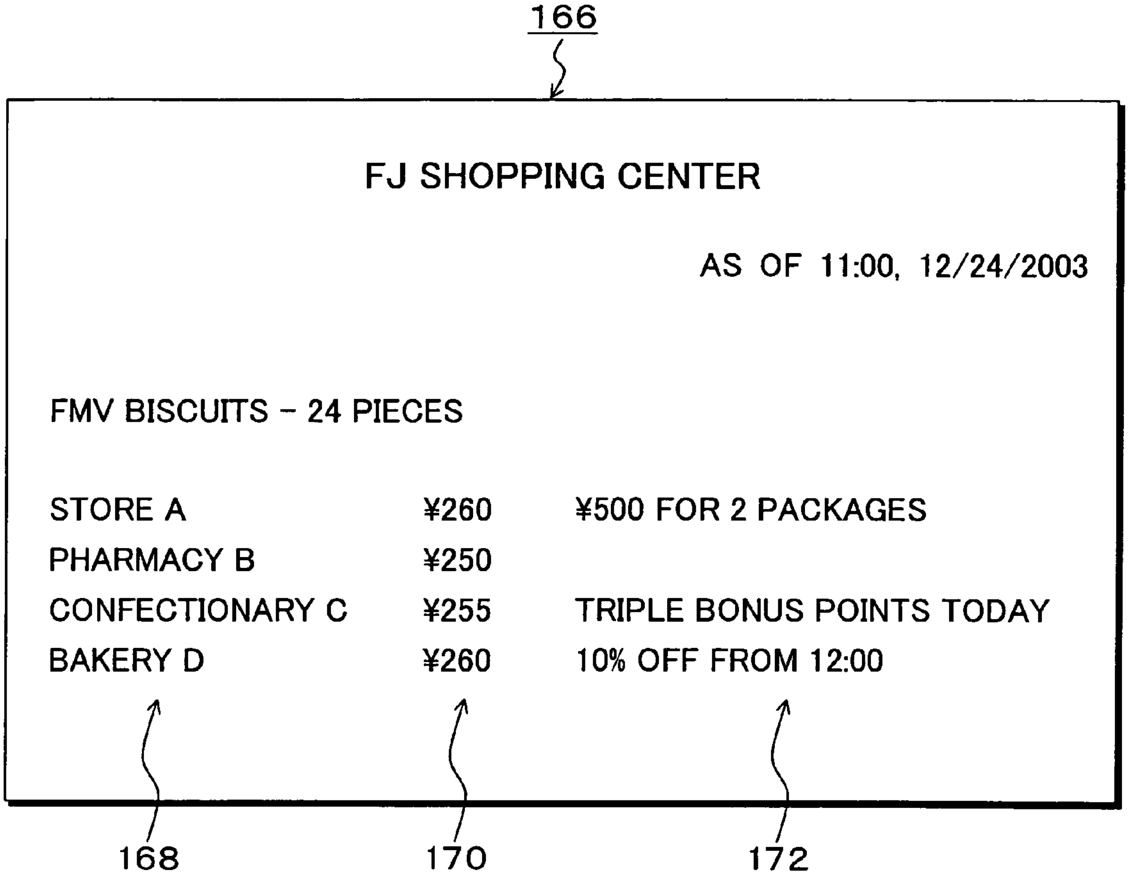
FIG. 17 is an explanatory view of a product Inquiry screen displayed in the processing of FIG. 16.

FIG. 17 shows an example of a product inquiry screen 166 displayed in the product inquiry processing of FIG. 6. On the product inquiry screen, stores 168, prices 170 and bonuses 172 are shown itemized for "FMV Biscuits—24 pieces", a product obtained by reading the wireless tag. This makes it possible for users to easily and readily determine from which store purchasing the product is most beneficial for them by looking at the product inquiry screen. For instance, a user wishing to purchase a single package of the product at the lowest price can purchase at Pharmacy B. In the case of other user hoping to purchase the low-priced product, irrespective of the quantity, on the other hand, it suffices to make a purchase at Store A. If other user is interested in bonus points rather than the price, it suffices to make a purchase at Confectionary C. Meanwhile, it is apparent that if it is 11:30 now, it is most beneficial to make a purchase at Bakery D. Thus, the present invention takes advantage of the fact that the product provision store code and the product code are memorized in the wireless tag, allowing for effective product inquiry by users at facilities where a plurality of stores are gathered. It is to be noted that the product inquiry processing capability in FIG. 16 may be provided as a standalone product inquiry device rather than being incorporated in the POS device. For the product inquiry device, it suffices to equip a personal computer with the capabilities of the medium reading unit 42 and the inquiry processing unit 50 and provide the communications control unit 30, the wireless tag communications unit 34 and the antenna 36 as hardware.

Figure 18A:
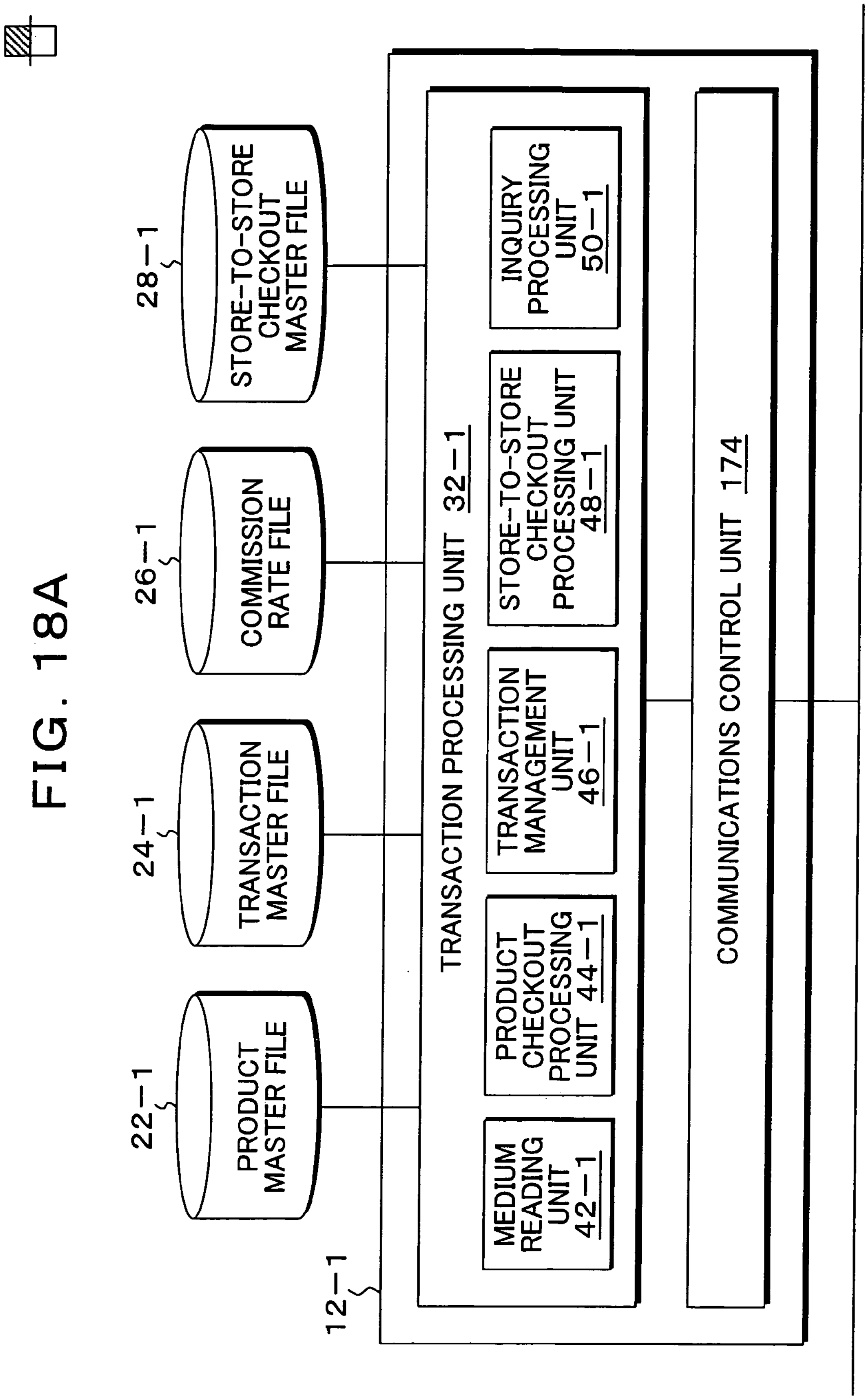
FIGS. 18A and 18B are block diagrams of another embodiment of the present invention provided with the store-to-store information send/receive processing capability on the store server side.
Figure 18B:
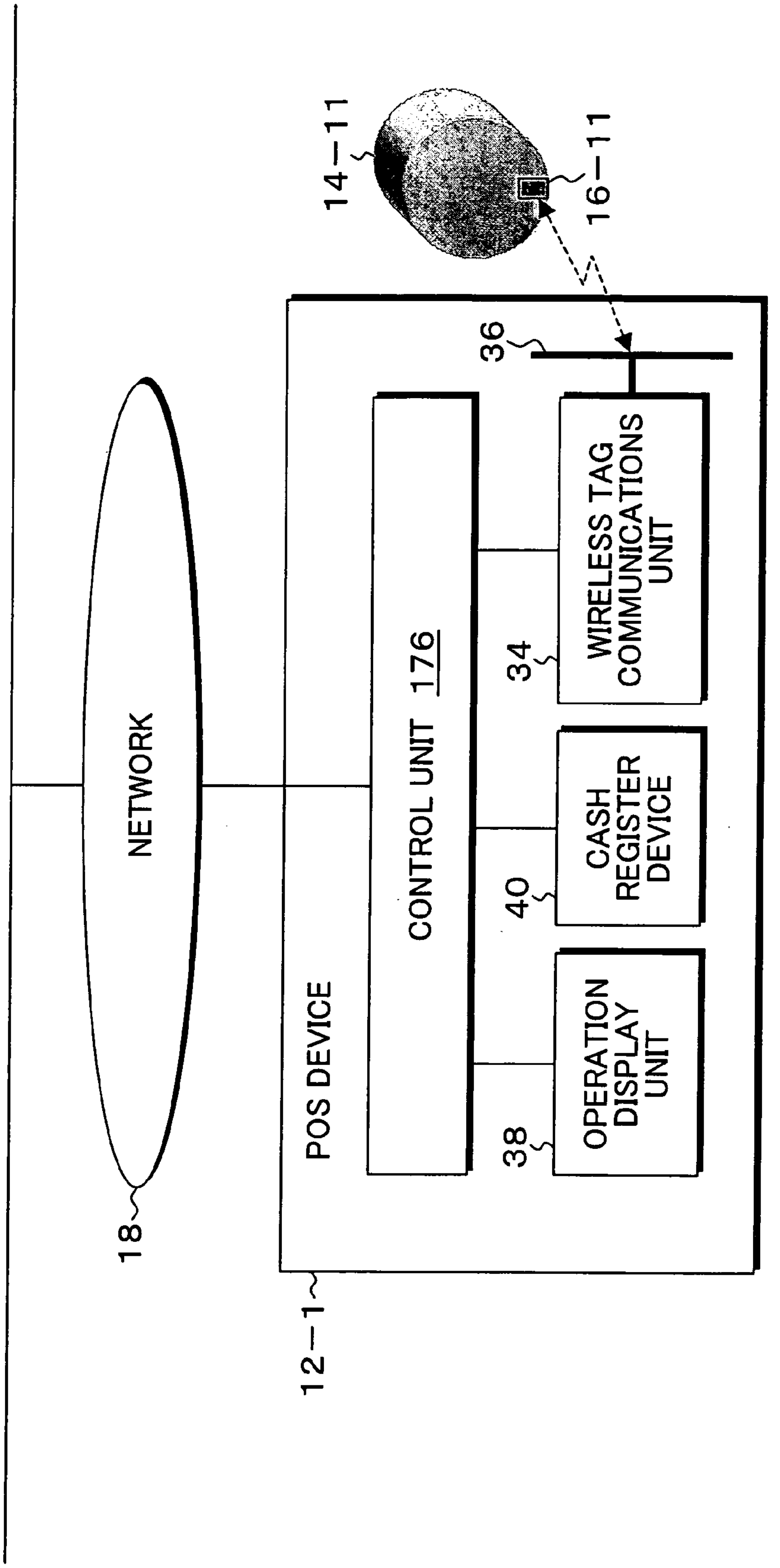

FIGS. 18A and 18B are block diagrams of another embodiment of the present invention provided with the store-to-store information send/receive processing capability on the store server side. That is, while the store-to-store information send/receive processing capability according to the present invention is provided on the POS device side in the embodiment shown in FIGS. 2A and 2B, the capability may be provided on the store server side as another embodiment. FIGS. 18A and 18B take as an example the store server 20-1 provided correspondingly with the store 10-1, with the store server 20-1 provided with a transaction processing unit 32-1 and a communications control unit 174. The transaction processing unit 32-1 is provided with a medium reading unit 42-1, a product checkout processing unit 44-1, a transaction management unit 46-1, a store-to-store information send/receive processing unit 48-1 and an inquiry processing unit 50-1. The individual processing capabilities are basically the same as those provided in the transaction processing unit 32 of the POS device 12-1 in FIGS. 2A and 2B. On the other hand, the POS device connected to the store server 20-1 via the network 18 is provided with a control unit 176, the wireless tag communications unit 34 equipped with the antenna 36, the operation display unit 38 and the cash register device 40. This embodiment differs from that in FIGS. 2A and 2B mainly in that the wireless tag 16-11 is read through the POS device 12-1, and information is displayed to users from the operation display unit 38 of the POS device 12-1. Such a configuration for providing the store-to-store information send/receive processing capability on the side of the store server 20-1 is convenient when the plurality of POS devices 12-1 is connected to the store server 20-1 via the network.

Figure 19:
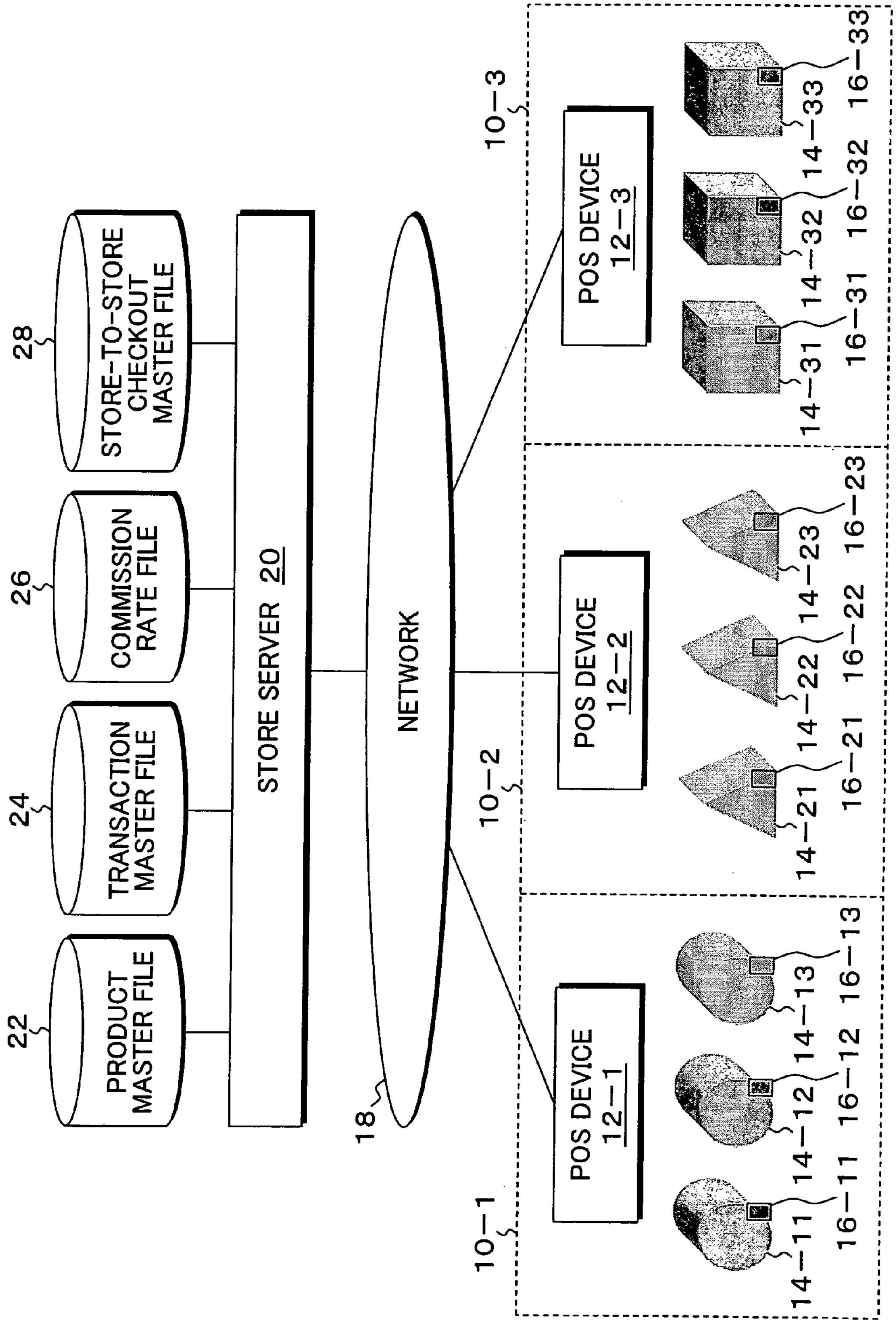
FIG. 19 is a block diagram of a still another embodiment of the present invention in which the POS devices of the stores are connected to a single server.

FIG. 19 is a still another embodiment of the present invention that is characterized in that a single server is provided for exercising control over all the stores. In FIG. 19, the POS devices 12-1 to 12-3 of the stores 10-1 to 10-3 are connected to the common server 20 via the network. The server 20 is provided with the product master file 22, the transaction master file 24, the commission rate file 26 and the store-to-store information send/receive master file 28. As for the capabilities of the server 20, the store complex checkout processing capability according to the present invention may be provided on the side of the POS devices 12-1 to 12-3 as in the embodiment of FIGS. 2A and 2B. Alternatively, the store complex checkout processing capability for each store may be provided in the server 20 as in the embodiment of FIGS. 18A and 18B. Thus, provision of only a single server for the stores leads to reduced equipment cost and operational cost. It is to be noted that while the aforementioned embodiments take as an example the wireless tag as a medium for storing the product provision store code and product information, the medium may be a barcode label, and an appropriate recording medium may be used as necessary.

The present invention is not limited to the above embodiments but can include any appropriate modifications without impairing the objects and advantages of the present invention. Further, the present invention is not subject to any limitations by the values shown in the above embodiments.

What is claimed is:

1. A store complex checkout apparatus, comprising:

a plurality of store servers connected in a network, each store server corresponding to one of a plurality covered stores and including a product master file for performing checking of products by reading out information, via a POS system, from an information storage medium storing at least product codes and product provision store codes assigned to the products;

a medium reading unit that reads out the product provision store code and the product code assigned to a product from said information storage medium via the POS system;

a product checkout processing unit that performs checkout processing of the product based on information obtained by referring to the product master file of the store when the product provision store code included in information read out by the POS system is a product provision store code of a store where the POS system is located, and performs checkout processing of the product based on information obtained by referring to the corresponding product master file of another store via the network when the product provision store code included in information read out by the POS system is a product provision store code of the other store;

a transaction management unit that generates end stores transaction information including a product provision store code for each products product; and a store-to-store information send/receive processing unit that exchanges the transaction information with the POS system of the other store based on the transaction information when the transaction information includes the product provision store code of the other store.

2. The store complex checkout apparatus according to claim 1, wherein the transaction management unit stores as the transaction information a checkout store code, a product provision store code, a transaction category and transaction detail information, wherein the transaction category is classified into sold, canceled or returned, and wherein the transaction detail information includes a product code, a price and a quantity.

3. The store complex checkout apparatus according to claim 2, wherein the store-to-store information send/receive processing unit generates store-to-store information send/receive information for transaction information in which the checkout store code and the product provision store code are different from each other, the store-to-store information send/receive processing unit performing money delivery processing accompanying checkout between a checkout store and a product provision store based on the store-to-store information send/receive information.

4. The store complex checkout apparatus according to claim 3, wherein the store-to-store information send/receive information includes a commission paid to the checkout store by the product provision store.

5. The store complex checkout apparatus according to claim 4, wherein the commission is a sum that is determined depending on a degree of contribution of the checkout store.

6. The store complex checkout apparatus according to claim 1, wherein the information storage medium is a wireless tag or a barcode label.

7. The store complex checkout apparatus according to claim 1, further comprising an inquiry processing unit that, based on the product code read from the information storage medium, acquires sales information including prices, store names and bonuses of a same product from product master information of a plurality of store checkout apparatuses, for display in a comparative manner.

8. A store complex checkout apparatus, comprising:

a medium reading unit that reads an information storage medium attached to a product offered by a plurality of stores, the information storage medium storing at least a product provision store code and a product code; and an inquiry processing unit that acquires sales information including prices, store names and bonuses of a same product from product master information of a plurality of store checkout apparatuses for display in a comparative manner, based on the product provision store code read from the information storage medium.

9. A transaction processing method for a store complex checkout apparatus including a plurality of store servers connected in a network, each store server corresponding to one of a plurality covered stores and including a product master file for performing checking of products by reading out information, via a POS system, from an information storage medium storing at least product codes and product provision store codes assigned to the products, the method comprising:

reading out the product provision store code and the product code assigned to a product from said information storage medium attached to the product, via the POS system;

performing checkout processing of the product based on information obtained by referring to the product master file incorporated in the store server of the store when the product provision store code included in the information read out by the POS system is a product provision store code of the store where the POS system is located, and performing product checkout processing based on information obtained by referring to the corresponding product master file of another store via the network when the product provision store code included in information read out by the POS system a product provision store code of the other store;

generating and storing transaction information including a product provision store code for each product; and exchanging the transaction information with the POS system of the other store based on the transaction information when the transaction information includes the product provision store code of the other store.

10. The transaction processing method for a store complex checkout apparatus according to claim 9, wherein a checkout store code, a product provision store code, a transaction category and transaction detail information are stored as the transaction information, wherein the transaction category is classified into sold, canceled or returned, and wherein the transaction detail information includes a product code, a puce and a quantity.

11. The transaction processing method for a store complex checkout apparatus according to claim 10, wherein the store-to-store information send/receive processing step includes generating store-to-store information send/receive information for transaction information in which the checkout store code and the product provision store code are different from each other, and performing money delivery processing accompanying checkout between a checkout store and a product provision store based on the store-to-store information send/receive information.

12. The transaction processing method for a store complex checkout apparatus according to claim 11, wherein the store-to-store information send/receive information includes a commission paid to the checkout store by the product provision store.

13. The transaction processing method for a store complex checkout apparatus according to claim 12, wherein the commission is a sum that is determined depending on a degree of contribution of the checkout store.

14. The transaction processing method for a store complex checkout apparatus according to claim 9, wherein the information storage medium is a wireless tag or a barcode label.

15. The transaction processing method for a store complex checkout apparatus according to claim 9, further comprising an inquiry step which includes, based on the product code read from the information storage medium, acquiring sales information including prices, store names and bonuses of a same product from product master information of a plurality of store checkout apparatuses, for display in a comparative manner.

16. A computer readable storage medium storing program code for causing a processor to execute a method for processing transactions using a store complex checkout apparatus having a plurality of store servers connected in a network, each store server corresponding to one of a plurality covered stores and including a product master file for performing checking of products by reading out information, via a POS system, from an information storage medium storing at least product codes and product provision store codes assigned to the products, the method reading out the product provision store code and the product code assigned to a product from said information storage medium attached to the product, via the POS system;

performing checkout processing of the product based on information obtained by referring to the product master file incorporated in the store server of the store when the product provision store code included in the information read out by the POS system is a product provision store code of the store where the POS system is located, and performing product checkout processing based on information obtained by referring to the corresponding product master file of another store via the network when the product provision store code included in information read out by the POS system is a product provision store code of the other store;

generating and storing transaction information including a product provision store code for each product; and exchanging the transaction information with the POS system of the other store based on the transaction information when the transaction information includes the product provision store code of the other store.

17. The program according to claim 16, wherein a checkout store code, a product provision store code, a transaction category and transaction detail information are stored as the transaction information, wherein the transaction category is classified into sold, canceled or returned, and wherein the transaction detail information includes at least a product code and a price.

18. The program according to claim 17, wherein the store-to-store information send/receive processing step includes generating store-to-store information send/receive information for transaction information in which the checkout store code and the product provision store code are different from each other, and performing money delivery processing accompanying checkout between a checkout store and a product provision store based on the store-to-store information send/receive information.

19. The program according to claim 18, wherein the store-to-store information send/receive information includes a commission paid to the checkout store by the product provision store.

20. A POS system in which a server is connected via a network to a plurality of store checkout apparatuses, each of the store checkout apparatuses comprising:

a medium reading unit that reads information from an information storage medium, the information storage medium being attached to a product and storing at least a product provision store code and a product code;

a product checkout processing unit that performs checkout processing of the product based on information obtained by referring to the product master file incorporated in the store server of the store when the product provision store code included in information read from the information storage medium is a code of the store, and performs checkout processing based on information obtained by referring to the corresponding product master file of another store via the network when the product provision store code included in information read out from the information storage medium is a product provision store code of the other store;

a transaction management unit that generates and stores transaction information including a product provision store code for each product; and a store-to-store information send/receive processing unit that exchanges the transaction information with the POS system of the other store based on the transaction information when the transaction information includes the product provision store code of the other store, wherein the store server stores the product master files and all transaction information used in the store checkout apparatuses of the stores, and said transaction information is exchanged between store checkout apparatuses of the stores.

* * * * *

UNITED STATES PATENT AND TRADEMARK OFFICE

CERTIFICATE OF CORRECTION

PATENT NO. : 7,159,769 B2
APPLICATION NO. : 10/873315
DATED : January 9, 2007
INVENTOR(S) : Miyuki Sato It is certified that error appears in the above-identified patent and that said Letters Patent is hereby corrected as shown below:

Column 13, Line 26, change “end” to --and--.

Column 13, Line 28, delete “products” before “product;”.

Column 14, Line 37, change “system” to --system is--.

Column 14, Line 52, change “puce” to --price--.

Signed and Sealed this

Eighth Day of April, 2008

JON W. DUDAS
*Director of the United States Patent and Trademark Office*